(12) United States Patent
Porikli et al.

(10) Patent No.: US 7,224,735 B2
(45) Date of Patent: May 29, 2007

(54) ADAPTIVE BACKGROUND IMAGE UPDATING

(75) Inventors: Fatih M. Porikli, Watertown, MA (US); Oncel Tuzel, Piscataway, NJ (US); Dirk Brinkman, Cambridge, MA (US)

(73) Assignee: Mitsubishi Electronic Research Laboratories, Inc., Cambridge, MA (US)

( * ) Notice: Subject to any disclaimer, the term of this patent is extended or adjusted under 35 U.S.C. 154(b) by 792 days.

(21) Appl. No.: 10/442,752

(22) Filed: May 21, 2003

(65) Prior Publication Data

US 2004/0239762 A1 Dec. 2, 2004

(51) Int. Cl.
*H04N 7/18* (2006.01)
(52) U.S. Cl. .............................. 375/240.25; 375/340.26
(58) Field of Classification Search ............................... 375/240.01–240.29
See application file for complete search history.

(56) References Cited

U.S. PATENT DOCUMENTS

| | | | | |
|---|---|---|---|---|
| 5,012,522 | A * | 4/1991 | Lambert | 382/118 |
| 6,307,964 | B1 * | 10/2001 | Lin et al. | 382/203 |
| 6,400,846 | B1 * | 6/2002 | Lin et al. | 382/199 |
| 6,826,316 | B2 * | 11/2004 | Luo et al. | 382/305 |
| 6,915,011 | B2 * | 7/2005 | Loui et al. | 382/224 |

OTHER PUBLICATIONS

Stauffer C, Grimson W. E. L. Adaptive background mixture models for real-time tracking. In Proceedings. 1999 IEEE Computer Society Conference on Computer Vision and Pattern Recognition (Cat. No. PR00149). IEEE Comput. Soc. Part vol. 2, 1999.
Horprasert T., Harwood D., Davis L.S. A statistical approach for real-time robust background subtraction and shadow detection. In IEEE ICCV'99 Frame-Rate Workshop. 1999.
D. Koller, J. Weber, T. Huang, J. Malik, G. Ogasawara, B. Rao, and S. Russel. "Towards robust automatic traffic scene analysis in real-time." In Proc. Of the International Conference on Pattern Recognition, Israel, Nov. 1994.
Wren, Christopher R., Ali Azarbayejani, Trevor Darrell, and Alex Pentland. "Pfinder: Real-Time Tracking of the Human Body," In IEEE Transactions on Pattern Analysis and Machine Intelligence, Jul. 1997, vol. 19, No. 7, pp. 780-785.
P. Pong, and R. Bowden, "An improved adaptive background mixture model for real-time tracking with shadow detection", In Proc. 2nd European Workshop on Advanced Video Based Surveillance Systems, AVBS01. Sep. 2001.

(Continued)

*Primary Examiner*—Anand Rao
(74) *Attorney, Agent, or Firm*—Dirk Brinkuman; Clifton D. Mueller; Gene V. Vinouur

(57) ABSTRACT

A method compares a background image to input images to determine a similarity scores λ for each input image. Then, the background image is updated only if the similarity score for a particular image is less than a predetermined threshold. Presumably, any pixel whose color does not change is part of a static background, and any pixel that does change is part of a moving object. The similarity score controls when input images are scored and the manner the background image is updated.

18 Claims, 8 Drawing Sheets

OTHER PUBLICATIONS

N. Friedman and S. Russell, "Image segmentation in video sequences: A probabilistic approach," In Proc. Of the Thirteenth Conf. On Uncertainty in Artificial Intelligence, 1997.

C. Ridder, O. Munkelt, and H. Kirchner. Adaptive background estimation and foreground detection using kalman-filtering. International Conference on Recent Advances in Mechatronics, 1995.

* cited by examiner

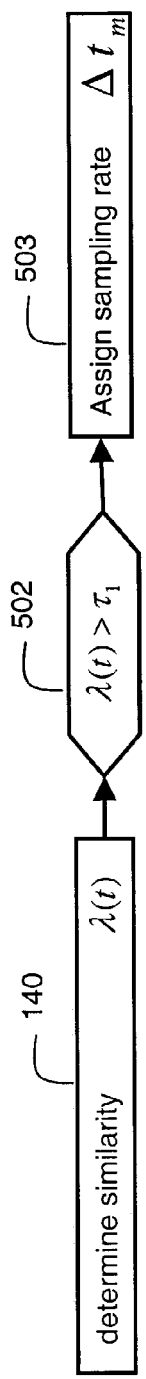
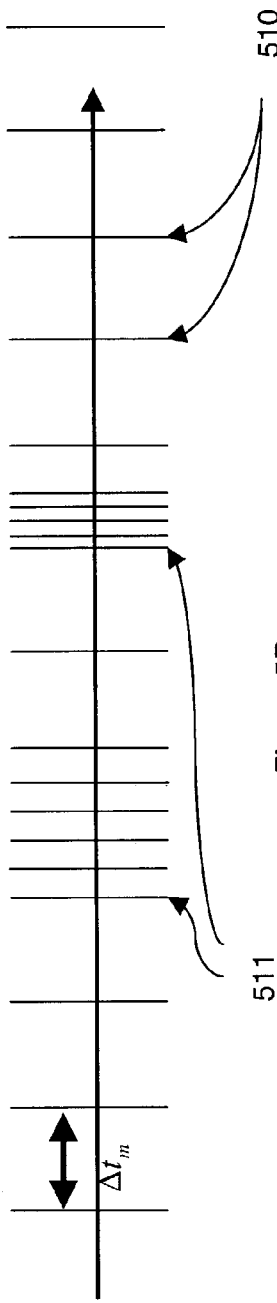
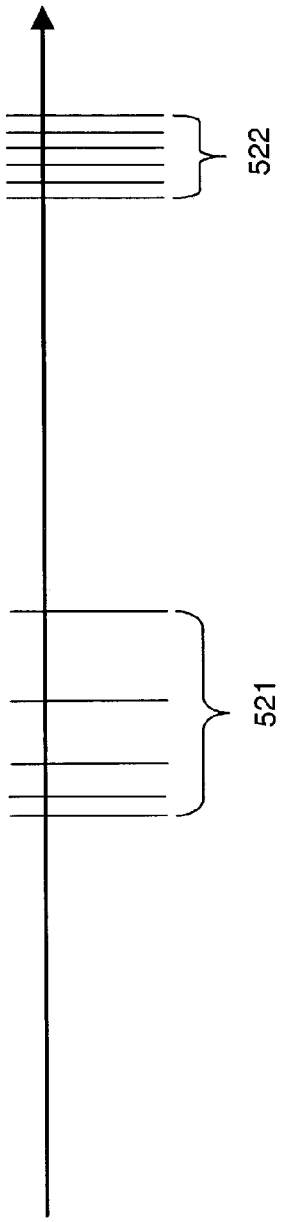
Figure 5A
Figure 5B
Figure 5C

ADAPTIVE BACKGROUND IMAGE UPDATING

FIELD OF THE INVENTION

This invention relates generally to image processing, and more particularly to updating a background image representing a changing background in a scene.

BACKGROUND OF THE INVENTION

In vision systems, it is a fundamental and crucial problem to extract moving objects from a video. Typical applications in which object extraction is necessary include surveillance, traffic monitoring, teleconferencing, human-machine interface, and video editing. There are many other image processing applications where it is important to be able to distinguish moving pixels from static pixels. It is common to refer to the moving object as a 'foreground' object. However, it should be understood that the relative depth at which the object moves with respect to the 'background' is not a factor.

Background subtraction is the most common technique for moving object extraction. The idea is to subtract a current image from a static image representing the 'background' in a scene. The subtraction should reveal the silhouettes of moving objects. Background subtraction is performed typically during a pre-processing step to object recognition and tracking. Most prior art background subtraction methods are based on determining a difference in pixel intensity values between two images.

Although prior art methods work well, they are susceptible to global and local color in intensity. If the color in portions of the background of an image changes, then the pixel intensity levels change accordingly, and those portions may be misclassified being associated with the foreground or a moving object. These changes cause the subsequent processes, e.g., recognition and tracking, to fail because accuracy and efficiency are crucial to those tasks.

In the prior art, computational barriers have limited the complexity of real-time video processing applications. As a consequence, most prior art systems were either too slow to be practical, or restricted to controlled situations.

Recently, faster computers have enabled more complex and robust systems for analyzing videos in real-time. Such systems can reveal real world processes under varying conditions. A practical system should not depend on the placement of cameras, the content of the scene, or lighting effects. The system should be able to track slow moving objects in a cluttered scene with a moving background, overlapping or occluded objects, objects in shadows and subject to lighting changes, as old object leave the scene, and new objects enter.

Non-adaptive background subtraction methods are undesirable because they require manual initialization to acquire the static background image. Without initialization, errors in the background accumulate over time, making non-adaptive methods useless for unsupervised, long-term tracking applications where there are significant changes in the background of the scene.

Adaptive background subtraction averages pixel intensities over time to generate the background image, which is an approximation of the background at any one time. While adaptive background subtraction is effective in situations where objects move continuously and the background is visible a significant portion of the time, it fails when there are many moving objects, particularly if the moving objects move slowly. Adaptive methods also fail to handle multimodal, or multiple alternating backgrounds, recover slowly when the background is uncovered and a single, predetermined threshold is used for the entire scene.

Changes in lighting cause many background subtraction methods to fail. Ridder et al. in "Adaptive background estimation and foreground detection using Kalman-filtering," ICRAM (International Conference on Recent Advances in Mechatronics), 1995, modeled each pixel with a Kalman filter. This modeling made their system less sensitive to lighting changes. While that method does have a pixel-wise automatic threshold, it still recovers slowly.

Koller et al., in "Towards robust automatic traffic scene analysis in real-time," Proceedings of the International Conference on Pattern Recognition, 1994, adapted Kalman filtering to an automatic traffic monitoring application.

A multi-class statistical model can also be used for tracking objects by applying a single Gaussian filter to each image pixel. After proper initialization with a static indoor scene, reasonable results can be obtained. Results for outdoor scenes are not available.

Friedman et al. in "Image segmentation in video sequences: A probabilistic approach," Proc. of the Thirteenth Conf. on Uncertainty in Artificial Intelligence, 1997, described a pixel-wise expectation-maximization (EM) method for detecting moving vehicles. Their method explicitly distributes pixel values into three classes representing the road, shadows, and vehicles. It is unclear what behavior their system would exhibit for pixels with other classifications.

Instead of using predetermined distributions, Stauffer et al., in "Adaptive background mixture models for real-time tracking," Proc. IEEE Conf. on Computer Vision and Pattern Recognition, Vol. 2, 1999, modeled each pixel as a mixture of Gaussian filters. Based on the persistence and the variance of each mixture, they determined the Gaussian filters that could correspond to background distributions. Pixels that do not fit the background distributions are considered foreground unless there is a Gaussian filter with sufficient and consistent evidence to support a background classification. Their updating has four problems. It considers every pixel in the image. The pixels are processed independently. It uses a constant learning coefficient, and the background image is always updated for every input image, whether or not updating is actually required. This can be quite time consuming, if the updating is at the frame rate.

Bowden et al., in "An improved adaptive background mixture model for real-time tracking with shadow detection," Proc. 2nd European Workshop on Advanced Video Based Surveillance Systems, AVBS01, September 2001, described a model based on the method of Grimson et al. They used an EM process to fit a Gaussian mixture model for the update equations during initialization.

Horprasert et al., in "A statistical approach for real-time robust background subtraction and shadow detection," IEEE ICCV'99 FRAME-RATE WORKSHOP, 1999, described a computational color model that considers brightness distortion and chromaticity distortion to distinguish shading background from the ordinary background or moving foreground objects. They also described a process for pixel classification and threshold selection.

In general, there are three major problems with prior art background image updating. First, every input image causes a background update. This wastes time. Second, every pixel in each image is considered during the updating. This wastes even more time. Third, the manner in which the background image is updated is fixed. This is sub-optimal. The invention addresses all three problems.

SUMMARY OF THE INVENTION

The invention provides a method that compares a background image to input images to determine a similarity scores λ for each input image. Then, the background image is updated only if the similarity score for a particular image is less than a predetermined threshold. Presumably, any pixel whose color does not change is part of a static background, and any pixel that does change is part of a moving object. The similarity score controls when input images are scored and the manner the background image is updated.

BRIEF DESCRIPTION OF THE DRAWINGS

FIG. 5A is a block diagram of an update controller;

FIG. 5B is a timing diagram of continuous updates according to the invention;

FIG. 5C is a timing diagram of impulse updates according to the invention;

DETAILED DESCRIPTION OF THE PREFERRED EMBODIMENT

Introduction

In adaptive background image updating according to the invention, a background image is compared to input images to determine a similarity scores λ for each input image. Then, the background image is updated only if the similarity score for a particular image is less than a predetermined threshold. Presumably, any pixel whose color does not change is part of a static background, and any pixel that does change is part of a moving object. The similarity score controls when input images are scored and the manner the background image is updated.

Thus, the first problem is to determine the background image. During long-term tracking, the background image should be updated according to changes in lighting condition of the scene. Thus, the second problem is how much to update the background image according to similarity score.

It should be noted that the differences in images can be due to a moving object entering the scene, and then stopping. In such a case, it is necessary to make the stopped object part of the background. In such as case, the color values of the stopped object can simply replace the color values of what was the underlying background. For much subtle changes in color, due to the direction and intensity of light, e.g., the moving sun or absence thereof, some type of blending is preferred. The third and fourth problems are to determine a rate of scoring and potential updating, and the minimum number of necessary pixels that should be updated.

Adaptive Updating Method

Figure 1:
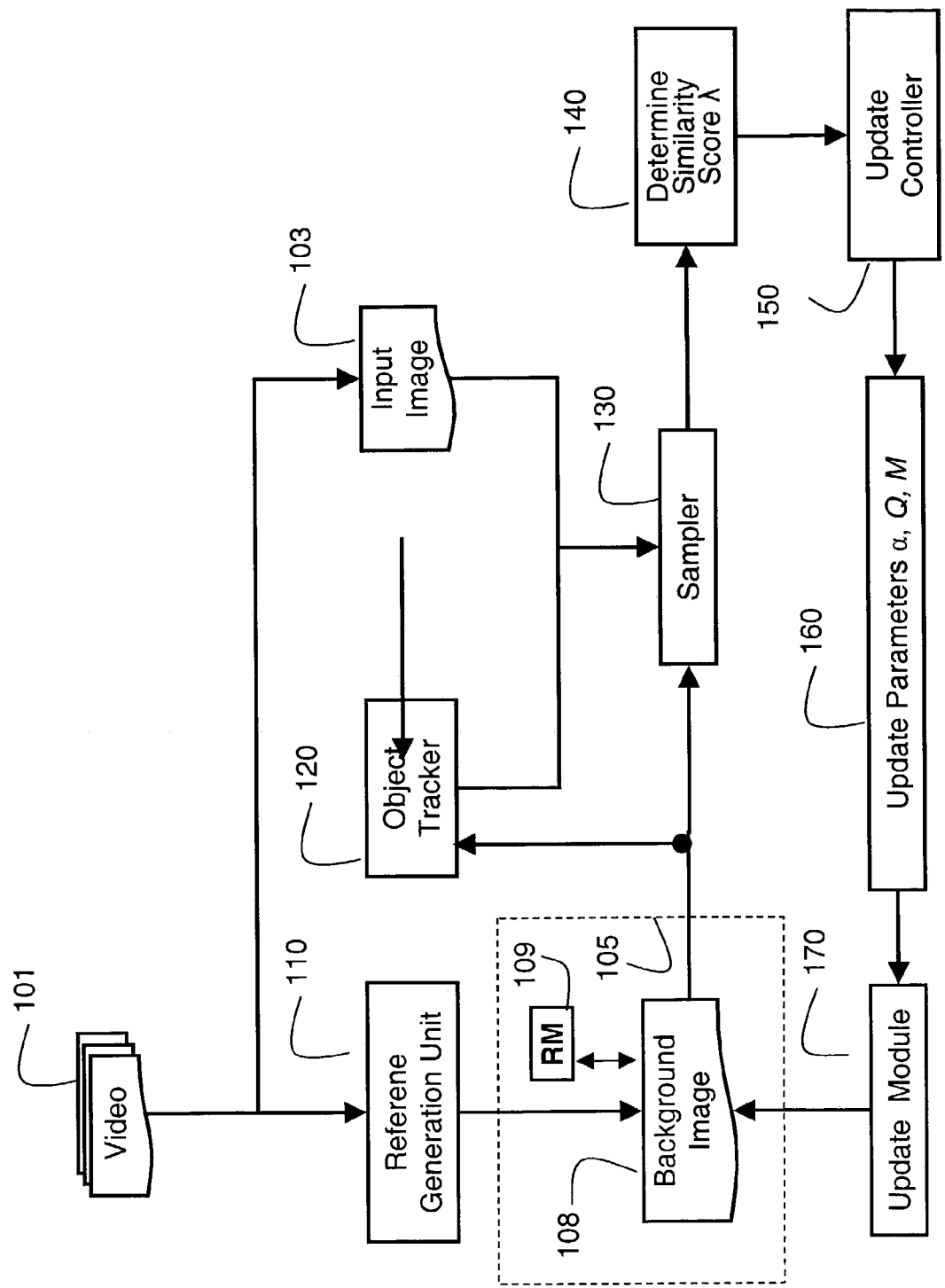
FIG. 1 is a block diagram of a method for adaptively updating a background image representing a changing background in a scene according to the invention.
Figure 2C:
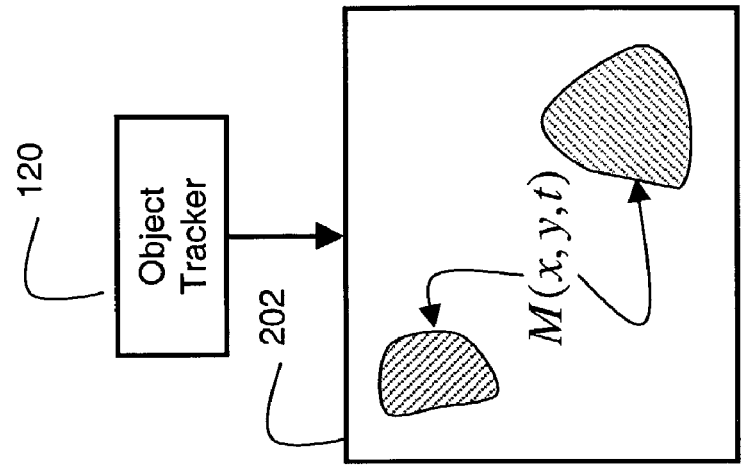
FIGS. 2A-C are block diagrams of a background image, an input image, and an object mask, respectively.

FIG. 1 shows a method for adaptively updating a background image B 108 representing a background in a scene according to the invention. The input to the method are images I 101 acquired of the scene, e.g., a video, see FIG. 2A.

Figure 2B:
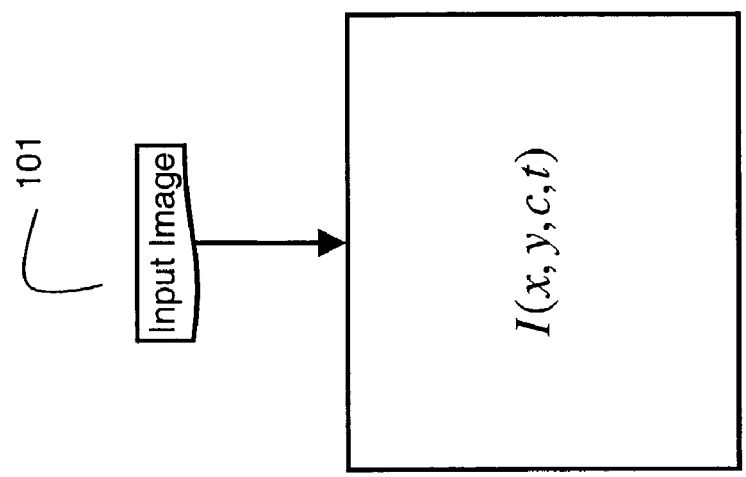
Figure 2A:
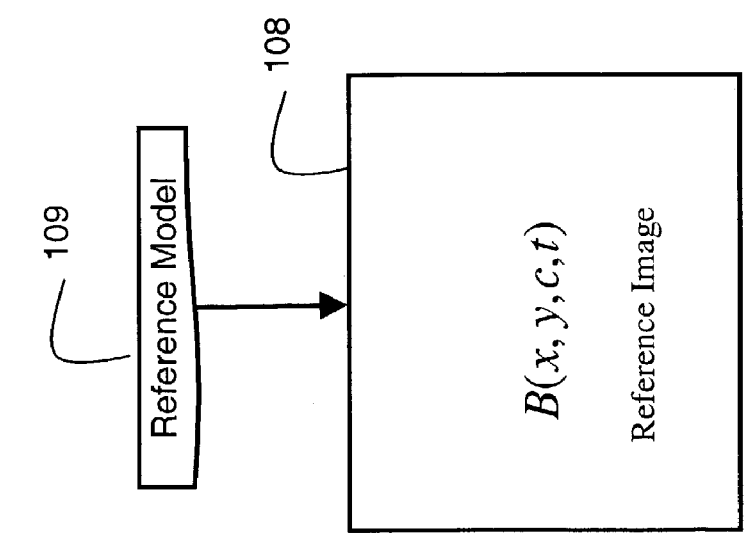

A background generation unit initializes 110 the background image 108 as described in greater detail below, see FIG. 2B. We distinguish our background image 108 from a prior art background image as follows. As used in the prior art, a background image is typically a one-time, static image of a background scene. While in an adaptively updated background image according to the invention, only portions of the background that experience color changes are updated 170 only when needed, over time. The background image 108 can be stored in a memory 105 of a computer system while the computer implemented method as described herein operates on the background image.

Background Image Initialization

The initial background image 108 can be constructed from the first, or first few frames of the video 101. For example, the background image is the first image, or an average of the first few images. Alternatively, the background image is initialized as a blank or random image. In this case, the updating as described herein, will automatically replace the initial background image when the first input image is processed.

Reference Model

In the preferred embodiment, the background image is 108 is derived from an intermediate reference model (RM) 109 also stored in the memory 105. It should be understood that the reference model is not required for the basic operation of the invention.

The reference model 109 is in the form of pixel-wise mixture of probability distribution functions to support multi-model backgrounds. We model the history of a color channel by expressing each pixel by a mixture of Gaussian distributions.

The color value of a pixel in the current input image I 101 is denoted by I(p). The probability of observing a current pixel color value for a single channel at frame t is $$P(I(p),t)=\Sigma_n^N w_n(t)g(I(p), \mu_n(t), \sigma_n^2(t))$$

where N is the number of distributions, $w_n(t)$ is the weight of the $n^{th}$ Gaussian distribution in the mixture, $\mu_n(t)$ and $\sigma''_2(t)$ are the mean value and the variance of the $n^{th}$ Gaussian distribution in the mixture at frame t respectively, and g is a Gaussian probability density function $$g(I(p), \mu, \sigma^2) = \frac{1}{\sqrt{2\pi}\sigma}e^{-\frac{[I(p)-\mu]^2}{\sigma^2}}.$$

In the above formulation, the color channels are assumed to be independent from each other. A covariance matrix could also be used. However, the matrix provides only a minimal improvement with a considerable increase in the computational complexity.

Object Tracker

The object tracker 120 compares each input images I 101 to the background image B 108. The purpose of the object tracker is to identify pixels that are associated with moving objects. To reduce the computational load, these pixels should not be considered during the updating 170. The object tracker generates a binary mask M 202, see FIG. 2C. The object tracker 120 can use a well known means-shift operation on the previous and current images to track pixels associated with moving objects. The purpose of the object tracker is not to consider pixels that are part of moving objects for updating purposes.

A distance d(p) between a pixel in the current input image 101 and the corresponding pixel in the background image 108 is defined as $$d(p)=|B(p)-I(p)|\overline{\omega}_n^*(t,p),$$

where $w_n^*(t,p)$ stands for a weight of the best distribution corresponding to pixel p. If this distance is larger than a distance threshold, then the pixel is marked with a binary 1 as a possible foreground pixel, otherwise it is marked as a zero. It should be noted that it may be advantageous to use the previous image instead of the current to determine the mask 202. In addition, it should be understood that the object tracker is not required for the basic operation of the invention. For example, other sensing means can be used to determine whether or not there is a moving object in the scene.

Sampling

The sampler 130 also takes input from the input image 101 and the background image 108. The sampler 130 selects certain number (S) of pixels to compare. The selected pixels do not correspond to moving object in the current image. The selection can be random. Alternatively, the sampling can be uniform up to a predetermined number S of pixels. Pixels corresponding to moving object are disregarded by the sampling process 130. Thus, foreground or moving object pixels do not influence the updating 170. The set of the pixels obtained after sampling process is denoted by $Q_s$.

Uniform selection with sampling frequencies $C_{1s}$, $C_{2s}$ generates the set Q as $Q \rightarrow \{B(x_s,y_s,c,t),I(x_s,y_s,c,t)|(x_s,y_s)= (c_{1s}m,c_{2s}n) \wedge M(x_s,y_s,t) \neq 1\}$, where B(x,y,c,t) is the background image 108, I(x,y,c,t) is the current image 101, M(x,y,t) is the object mask 202 obtained from the object tracker 120 such that M it is equal to 1 if pixel (x,y,t) corresponds to an object, c is the color channel, t is the frame number, and the number of selected pixels in the set Q is s=1, . . . , S. The output sampling 130, the set Q, is used to determine 140 a similarity score λ. The sampler 130 decreases the computational load for determining 140 the similarity scores. It should be noted that the sampler 130 is not required for the basic operation of the invention.

Determining Similarity Scores

The similarity score λ controls when input images are scored and the manner in which the background image 108 is updated. As stated above, the update only occurs if the similarity score is less than a predetermined threshold. In addition, there is no need to update pixels in the reference model that already have a very low variance. Instead of updating the background image and reference model at a predetermined or fixed rate, as in the prior art, we determine image similarity scores λ and control the scoring 140 and updating 170 accordingly.

For this propose, we determine the similarity score λ(t) for the set of selected pixels Q that do not correspond to a moving object. These pixels were selected by the sampler 130 as described above. The similarity scores are computed from color attributes of the pixels.

In order to understand the scoring process, a brief description of attributes of color as perceived by living creatures is provided. A number of color models are known. One human oriented model uses hue, chrominance, and intensity. Hue is the dominant wavelength of the color, chrominance or saturation is the degree of departure of a color from a neutral color, such as white, and intensity is related to the emitted energy of a color.

The red-green-blue (RGB) model is additive according to the intensity of the three basic colors. The YIQ model is a differential version of the RGB model. These two models are typically used in display devices. The cyan-magenta-yellow-black (CMY(K)) model is subtractive and is used frequently for printing.

The YUV model, Y represents intensity, and UV represents hue and saturation. Here UV is also called chrominance. The HIS model is the YUV model in polar coordinates that expresses hue as an angle, saturation as a radial component, and intensity veridical to the UV plane. Other color models, such as the HIS, HSV, CIE, LAB, and XYZ models can also be used. The scoring according to the invention can consider any of these color attributes, or combinations thereof.

Figure 3:
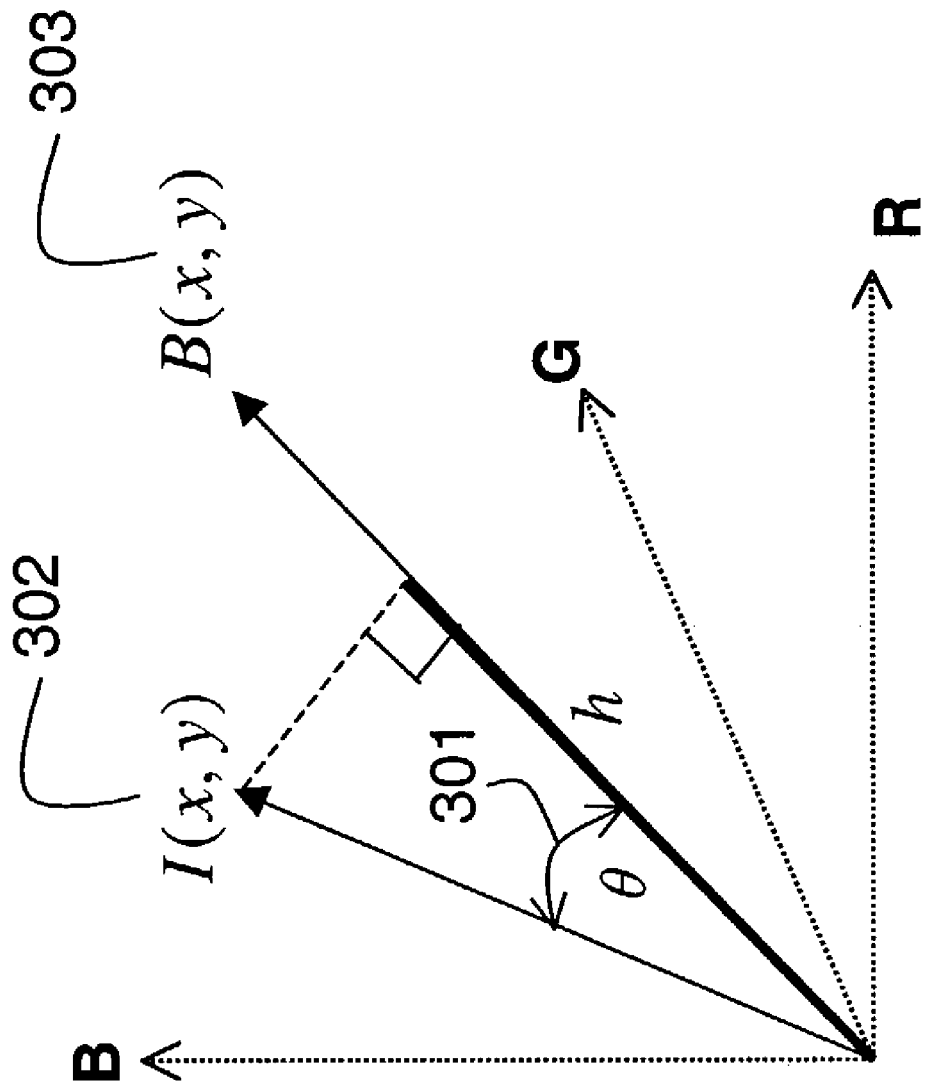
FIG. 3 is a graph of color evaluation in an RGB color domain according to the invention.

For example as shown in FIG. 3 for the RGB model, the determining 140 evaluates the color values (R,G,B) of the selected pixels in the set Q, and expresses the similarity score as a ratio $$\lambda(t) = \sum_s^S \left| \frac{|B(x_s, y_s, c, t)I(x_s, y_s, c, t)|\cos\theta - |B(x_s, y_s, c, t)|^2}{|B(x_s, y_s, c, t)|} \right|,$$

where θ 301 is the angle between the pixel S color vector I(.) 302 and the background color vector B(.) 303.

Alternatively, we can convert to color vectors in the YUV color domain, and evaluate similarities in Y-channel versus U and V channels as $$\lambda(t) \equiv \frac{\sum_s^S |B(x_s, y_s, Y, t) - I(x_s, y_s, Y, t)|}{\sum_s^S |B(x_s, y_s, U, t) - I(x_s, y_s, U, t)| + \sum_s^S |B(x_s, y_s, V, t) - I(x_s, y_s, V, t)|}.$$

In another method, we determine the similarity score for selected pixels by $$\lambda(t) \equiv \sum_c \sum_s^S |B(x_s, y_s, c, t) - I(x_s, y_s, c, t)|.$$

Figure 4:
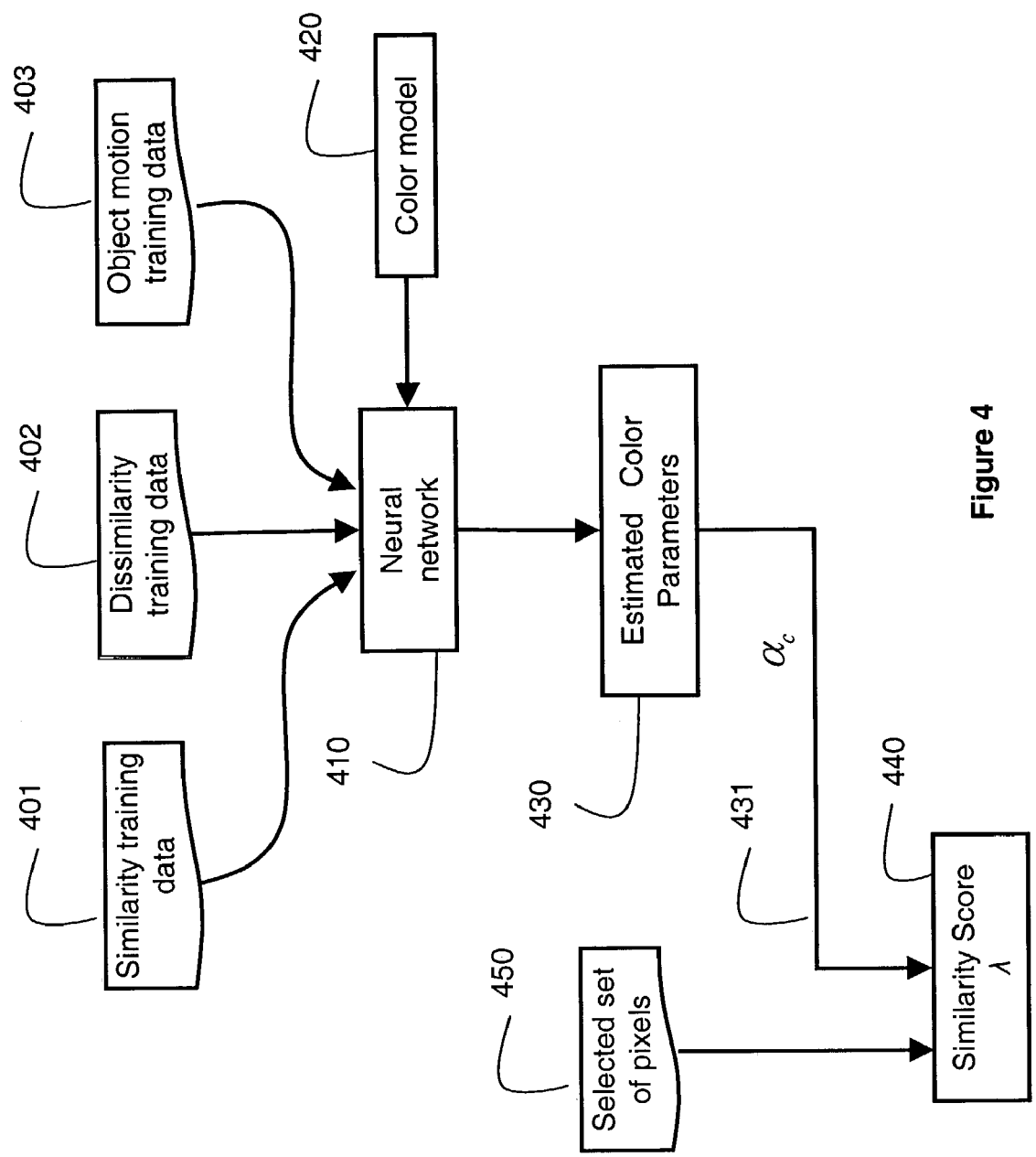
FIG. 4 is a block diagram of a process for estimating parameters of a color model according to the invention.

Using machine learning as shown in FIG. 4, we can also determine color change parameters by training a neural network according to $$I^*(x_s, y_s, c, t) = f(\alpha_c, I(x_s, y_s, c, t)), \text{ and}$$

$$\lambda(t) \equiv \frac{1}{S} \sum_s |B(x_s, y_s, c, t) - f(\alpha_c, I(x_s, y_s, c, t))|.$$

Using similarity training data 401, dissimilarity training data 402, object motion training data 403, and an color model 420, a neural network 410 is trained, and estimated color model parameters $\alpha_c$ 431 are obtained 430 and compared with selected pixels 450 to determine the similarity score $\lambda$ 440.

Update Controller

The purpose of the update controller is to provide the parameters 160 for the update module 170, namely a learning coefficient or blending weight $\alpha$, the set Q, and an update mode M. The update controller also determines when input images should be scored to lead to a potential update. If the illumination in the scene is changing rapidly, then the scoring rate should approach the frame rate. Conversely, when the scene is relatively stable, scoring can take place infrequently.

One way to interpret the similarity score $\lambda$ is as follows. If a normalized score is in the range [0,1], then a score of 1 means the input and background images are identical, and a score of zero means that the images are completely different. The threshold can be set anywhere in the range [0,1] to match a desired sensitivity.

We consider three rates, a frame rate $r_f$ at which images are acquired, a scoring rate $r_s$, which determines when the similarity of input images are determined, and an update rate $r_u$, which reflects the frequency at which the background image is actually updated. According to the invention, the relationship between these rates can be expressed as $r_u \leq r_f \leq r_s$, whereas the relationship for the prior art is usually $$r_u = \frac{r_f}{k}.$$

If the frame rate is relatively high and the background remains stable, and k=1, then the invention provides a substantial saving in time over prior art methods because $r_u$ will approach zero.

FIG. 5A show the process of the update controller 150. First determine 140 the similarity score $\lambda$ as described above. We presume that scoring includes the object tracking 120 and sampling 130 steps. In practice, the scoring rate is expressed as a time interval $\Delta t_m$ such that $$\Delta t_m \begin{cases} \Delta t_{\max} & \lambda(t) \geq \tau_0 \\ \min(\Delta t_{m-1} + 1, \Delta t_{\max}) & \tau_0 > \lambda(t) \geq \tau_1, \\ 1 & \tau_1 > \lambda(t) \end{cases}$$

where m is the total number of updates after initialization, $\tau_1 < \tau_0$, and $\Delta t_{max}$ is a maximum number of images that are processed before the next time an image is scored. The threshold value of $\tau_1$ can be determined empirically. The threshold controls the sensitivity of the update process. This parameter can depend on the amount of noise in the images.

If the value of the similarity score $\lambda(t)$, at time t, is less than a predetermined threshold $\tau_1$ in step 502, then a learning or blending parameter $\alpha$ is adjusted as $$\alpha = 0.01 + \frac{\lambda(t)}{s} \quad \tau_1 > \lambda(t),$$

where s is the number of pixels in the set Q.

The learning coefficient or blending weight alpha ($\alpha$) serves as a parameter that controls the manner of updating, i.e., how much of the color values of the pixels in the reference model is influenced by the color values of the current image 101. If the color similarity score between the reference model and the current frame is relatively high, then the learning coefficient is assigned a lower value. Thus, the reference model is influenced less by the current image. High values for the learning coefficient, e.g., $\alpha$=1, cause a moving object to 'blend' into the background when the object stops moving.

Modes of Update

As shown in FIG. 5B, the input images can be scored continuously with a variable and/or, constant rate. For example, the images are always scored at least at a constant lower 'background' rate 510, and at other times at a higher rate 511. For example, if the dissimilarity is relatively high, then scoring should occur more frequently.

As shown in FIG. 5C, the scoring can also be done impulsively, as needed, at a variable rate 521 or a constant rate 522.

Figure 6:
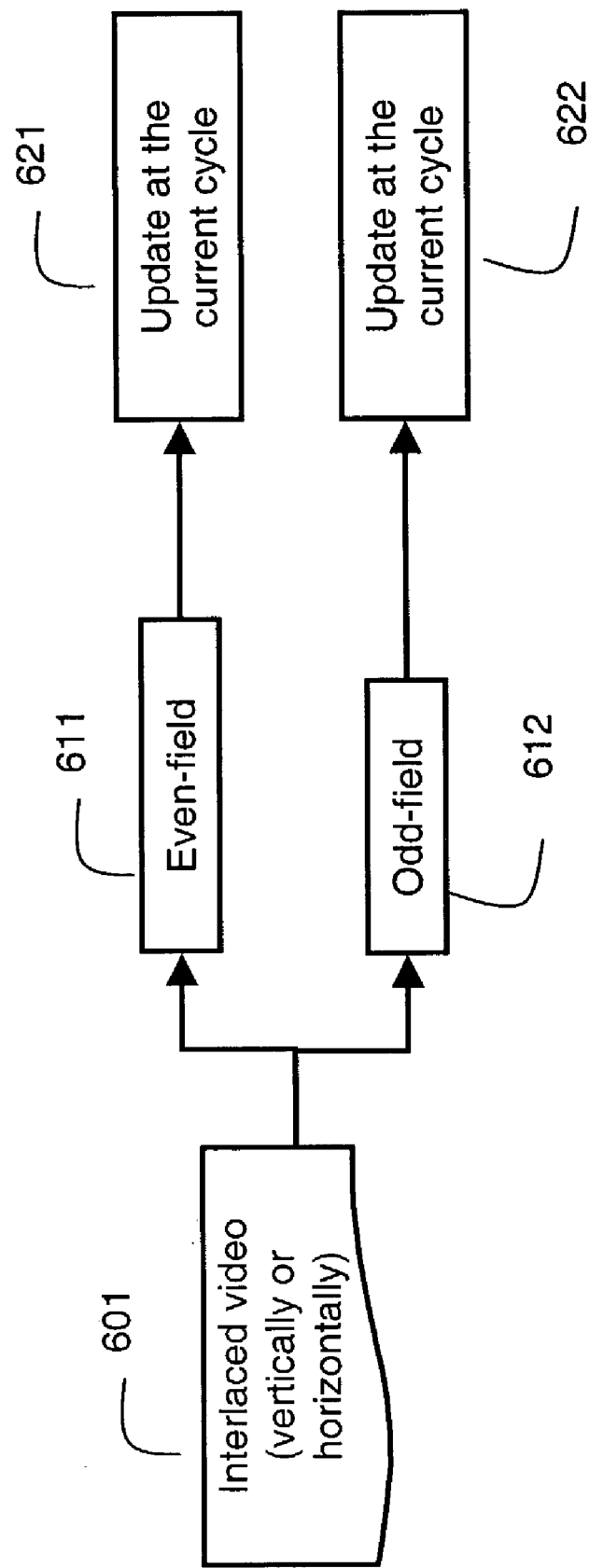
FIG. 6 is a block diagram of an update controller using interlaced video.
Figure 7:
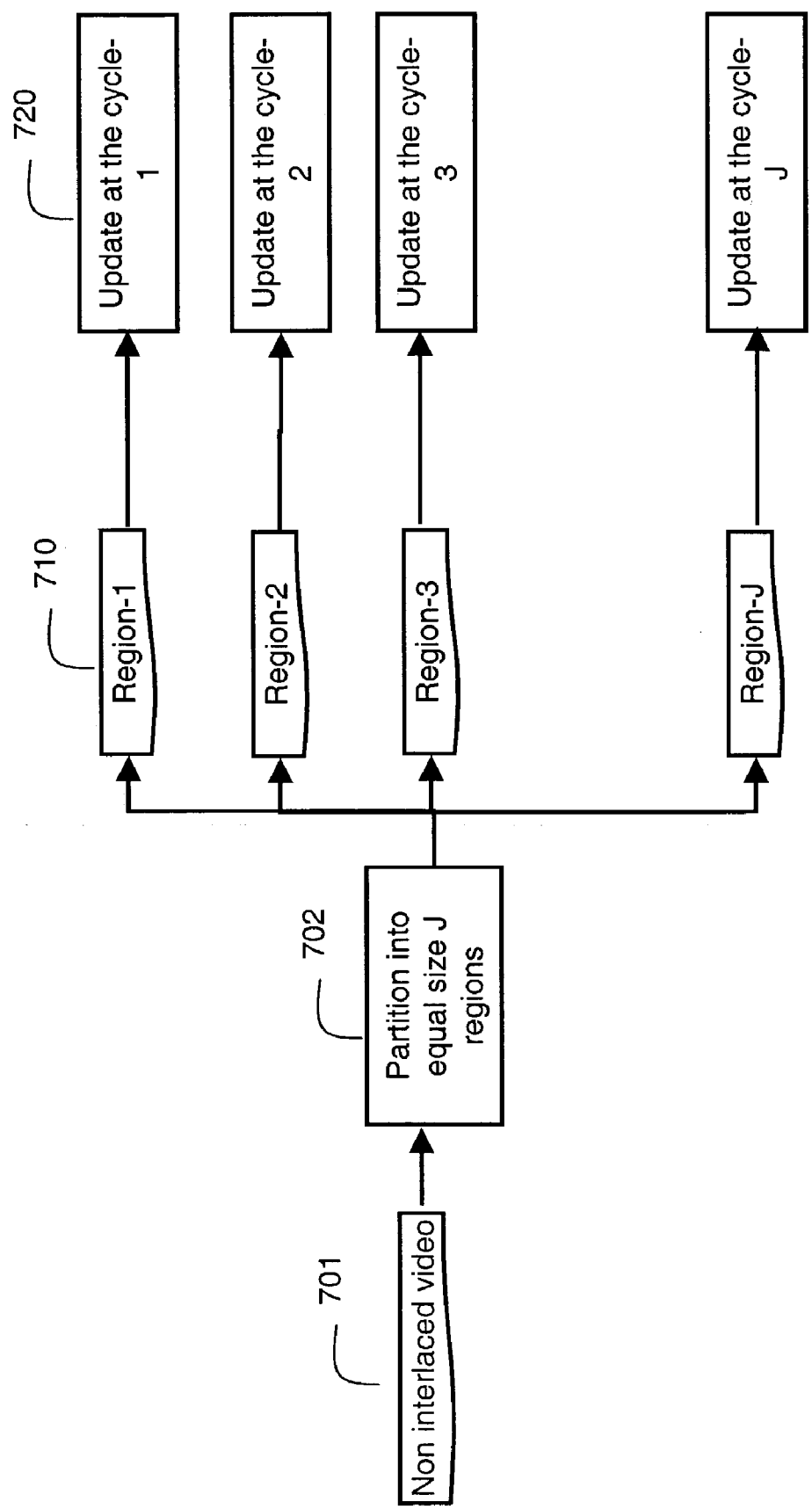
FIG. 7 is a block diagram of an update controller with identical regions.
Figure 8:
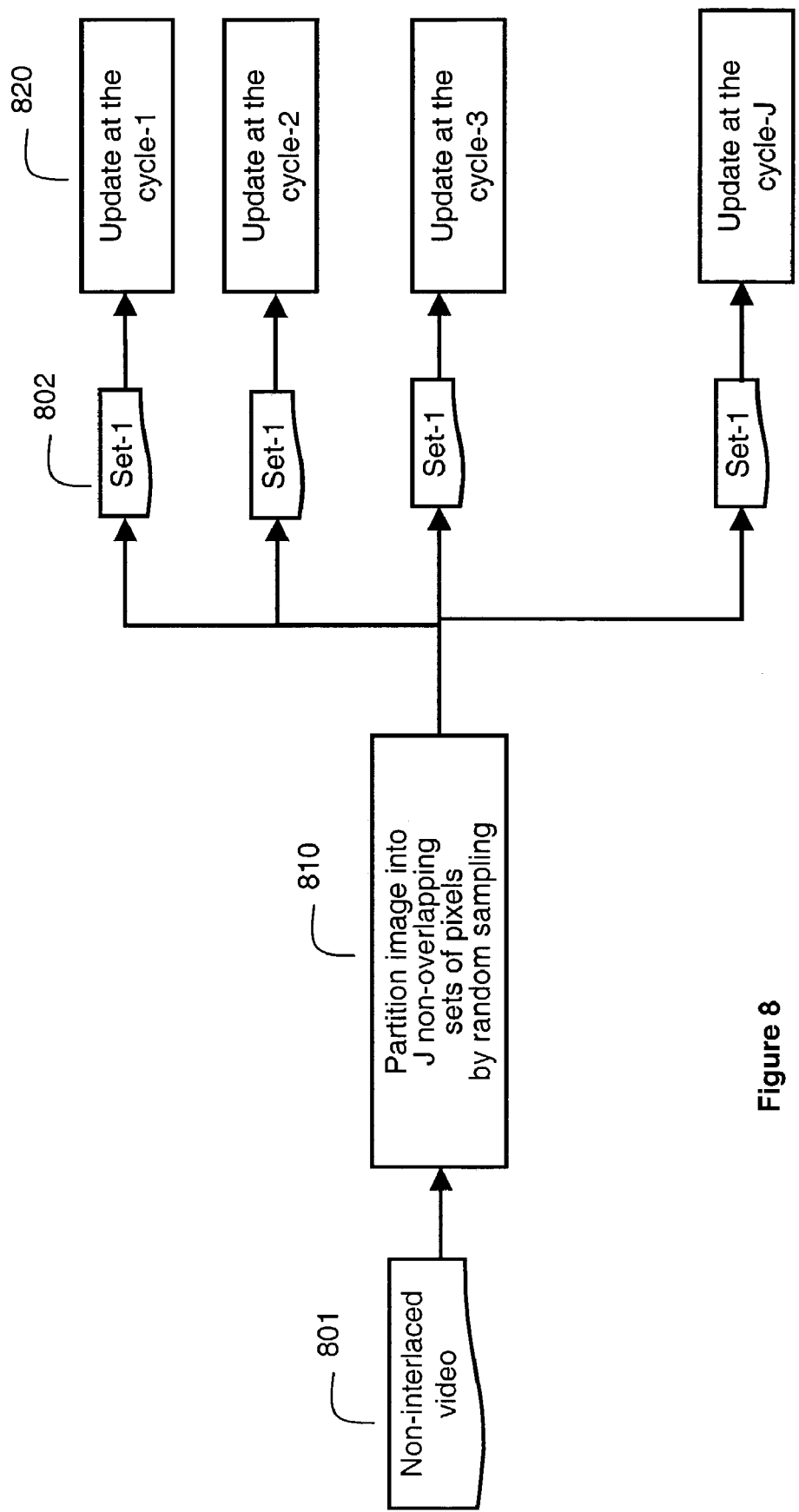
FIG. 8 is a block diagram of an update controller with random sets of pixels.

Instead of updating the entire reference model, the update process can also be applied to specific regions of the background image. We provide several methods for partial updates of the background image as shown in FIGS. 6-8.

For an interlaced video 601, the even-field 611 and the odd-field 612 can be updated during respective update cycles 621 and 622.

For a non-interlaced video 701, an image can be partitioned 702 into J equal sized regions 710, and the regions 710 can update sequentially 720, in turn, during J update cycles.

An alternative process, partitions 810 a non-interlaced video 801 into J non-overlapping sets of pixels 802, that are then updated sequentially 820. Here, the sets of pixels can be obtained by a random sampling of the background image.

Model and Background Image Update

Initially, the variances of all pixels in the model are set to a high value, and their weights to a small value, because none of the pixels have sufficient statistics to make confident prediction of the actual current background. The reference model is updated by comparing the current pixel with existing K Gaussian distributions.

In case the color value of the current pixel is similar to the mean value of a distribution, it is marked as a match. The distance threshold is set to 2.5$\sigma$ to include 95% of the color values, which form the model. If none of the K distributions K<N matches the current pixel value, a new distribution is initialized.

In case of K=N, the distribution with a highest variance, i.e., a lowest confidence, is replaced with a distribution with the current pixels value as its mean value, and a large initial variance.

The means and variances of the matched distributions are quantitatively updated 170 using the learning coefficient $\alpha$ as $$\mu_n(t) = [1-\alpha]\mu_n(t-1) + \alpha I(p)$$

$$\sigma_n^2(t) = [1-\alpha]\sigma_n^2(t-1) + \alpha[\mu_n(t) - I(p)]^2,$$

and the weights of the existing K distributions $w_n(t)$ n=1, . . . ,K are adjusted as $$w_n(t) = \begin{cases} (1-\alpha)w_n(t-1) + \alpha & |\mu_n(t) - I(p)| < 2.5\sigma_n(t) \\ (1-\alpha)w_n(t-1) & |\mu_n(t) - I(p)| \geq 2.5\sigma_n(t), \end{cases}$$

where I(p) is the current color value of a pixel. This type of updating is sometimes also known as alpha-blending.

To determine the color value of a pixel of the background image 108 for a color channel from the corresponding pixel in the reference model 109, the Gaussian distribution with the smallest variance, i.e., the highest confidence, and the highest weight is selected. The mean of that pixel is used as the color value of the corresponding pixel in the background image 108.

Because the background image 108 is updated only when the similarity is less than a threshold value, a major reduction in overall computation is achieved, while still taking advantages of Gaussian mixture model approach.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for adaptively updating a background image representing a background of a scene, comprising:
   selecting, uniformly, a set Q of s pixels in each image, wherein the set Q is $Q \rightarrow \{B(x_s, y_s, c, t), I(x_s, y_s, c, t) | (x_s, y_s) = (c_{1s}, m, c_{2s}, n) \wedge M(x_s, y_s, t) \neq 1\}$, $B(x,y,c,t)$ is the background image, $I(x,y,c,t)$ is a particular image, $M(x,y,t)$ is an object mask, $c_{1s}$ and $c_{2s}$ are sampling frequencies, c is a color channel, t is a frame number associated with the particular image, and s is a number of pixels in the set Q;
   determining a similarity score for the set Q of s pixels in each of a plurality images of the scene; and
   updating the background image only if the similarity score for a particular image is less than a predetermined threshold.

2. The method of claim 1 wherein a rate of when the similarity scores are determined depends on the similarity score.

3. The method of claim 1 wherein a manner in which the background is updated depends on the similarity score.

4. The method of claim 1 further comprising:
   initializing the background image to a first one of the plurality of images.

5. The method of claim 1 further comprising:
   initializing the background image to a blank image.

6. The method of claim 1 wherein the background image is derived from a reference model in a form of pixel-wise mixture of probability distribution functions.

7. The method of claim 1 further comprising:
   identifying pixels in images associated with moving objects;
   excluding the identified pixels from the determining and updating.

8. The method of claim 7 wherein the identified pixels are represented by a binary mask.

9. The method of claim 1 wherein the pixels in the set are selected randomly.

10. The method of claim 1 wherein the similarity score is expressed as a ratio $$\lambda(t) = \sum_s^s \left| \frac{|B(x_s, y_s, c, t)||I(x_s, y_s, c, t)|\cos\theta - |B(x_s, y_s, c, t)|^2}{|B(x_s, y_s, c, t)|} \right|$$

where $\lambda(t)$ is the similarity score for an image at time t, B is the background image, I is the particular image, θ an angle between color vectors for a pixel at a location (x,y), and c is a color channel.

11. The method of claim 1 wherein the similarity score is expressed as a ratio $$\lambda(t) \equiv \frac{\Sigma |B(x, y, Y, t) - I(x, y, Y, t)|}{\Sigma |B(x, y, U, t) - I(x, y, U, t)| + \Sigma |B(x, y, V, t) - I(x, y, V, t)|},$$

where λ is the similarity score for an image at time t, B is the background image, I is the particular image, (x,y) is a pixel location, and c is a color channel.

12. The method of claim 1 wherein the similarity score is expressed as a ratio $$\lambda(t) \equiv \sum_c \sum |B(x_s, y_s, c, t) - I(x_s, y_s, c, t)|,$$

where λ is the similarity score for an image at time t, B is the background image, I is the particular image, (x,y) is a pixel location, and c is a color channel.

13. The method of claim 1 wherein the similarity score is determined by a trained neural network.

14. The method of claim 2 wherein the rate is expressed as a time interval $$\Delta t_m \begin{cases} \Delta t_{\max} & \lambda(t) \geq \tau_0 \\ \min(\Delta t_{m-1} + 1, \Delta t_{\max}) & \tau_0 > \lambda(t) \geq \tau_1, \\ 1 & \tau_1 > \lambda(t) \end{cases}$$

where m is a total number of updates, $\tau_1$ and are thresholds such that $\tau_1 < \tau_0$, and $\Delta t_{max}$ is a maximum number of images that are processed before next similarity score is determined.

15. The method of claim 1 further comprising:
    determining a blending parameter as $$\alpha = 0.01 + \frac{\lambda(t)}{s} \quad \tau_1 > \lambda(t),$$

where s is the number of pixels in the set Q, λ is the similarity score at a time t, and $\tau_1$ is the predetermined threshold.

16. The method of claim 15 wherein a particular pixel p in the background image is updated according to $$B(t) = [1-\alpha]p(t-1) + \alpha I(t).$$

17. The method of claim 1 wherein similarity scores are determined with a variable and a constant rate.

18. The method of claim 1 wherein only specific regions of the background image are updated.

* * * * *